Fig. 6.

April 26, 1966   B. E. BALDWIN ETAL   3,247,698
HUB FORMING METHOD AND APPARATUS
Filed April 9, 1962   7 Sheets-Sheet 6

United States Patent Office 3,247,698
Patented Apr. 26, 1966

3,247,698
HUB FORMING METHOD AND APPARATUS
Brian E. Baldwin and George F. Niemann, Evanston, and
Arthur J. Mix, Jr., Chicago, Ill., assignors to Manufacturing Process Laboratories, Inc., Chicago, Ill., a corporation of Illinois
Filed Apr. 9, 1962, Ser. No. 185,900
9 Claims. (Cl. 72—370)

This invention relates to a method and apparatus for forming the hubs of hypodermic needles.

In past years it has been the usual manufacturing practice to form the metal hubs of hypodermic needles on screw machines. The relatively high cost of screw-machined hubs and the increasing popularity of disposable single-use needles and syringes have prompted manufacturers to attempt forming needle hubs from sheet stock. While drawn hubs are cheaper than machined hubs, largely because of less material waste and shorter unit production time, such hubs characteristically lack a number of desirable features of machined hubs. For one thing, drawing operations do not permit the forming of hubs having knurled or ribbed outer surfaces. Hubs formed by successive drawing operations are generally of uniform wall thickness and, therefore, the formation of a hub having a generally cylindrical inner surface but a square or non-cylindrical outer surface is an operation which until now has been performed only by screw machines.

Accordingly, it is a main object of the present invention to provide a method and apparatus for forming hypodermic needle hubs which has the low cost advantages of drawing operations but which produces hubs of a quality and construction previously obtainable only by relatively costly machining operations. Another object is to provide a fast and economical method for forming hypodermic needle hubs having non-circular outer surfaces but having generally cylindrical inner surfaces. A further object is to provide a method for forming hypodermic needle hubs having end flanges of any desired size and shape, depending upon the requirements of the holders with which such needles and hubs are intended to be used.

Another object of this invention is to provide a method for cold forming the blanks of hypodermic needle hubs so that such blanks may be readily and automatically worked and finished at piercing and trimming stations. It is a further object to provide a method of forming blanks from slugs of different size without any size differences in the final products. A still further object is to provide a method for forming blanks which may later be finished with end flanges of any selected size and shape.

Another object is to provide a hub forming method and apparatus by which hub blanks are pierced to receive cannulae, such piercing being performed without the formation of slugs and without danger of damaging the piercing element through lateral deflection. In this connection, it is a specific object to provide an apparatus and method for piercing holes of lengths exceeding five times their diameters without danger of damage to the piercing equipment.

Other objects will appear from the specification and drawings in which.

Figures 1, 2, 3, 4, 5:
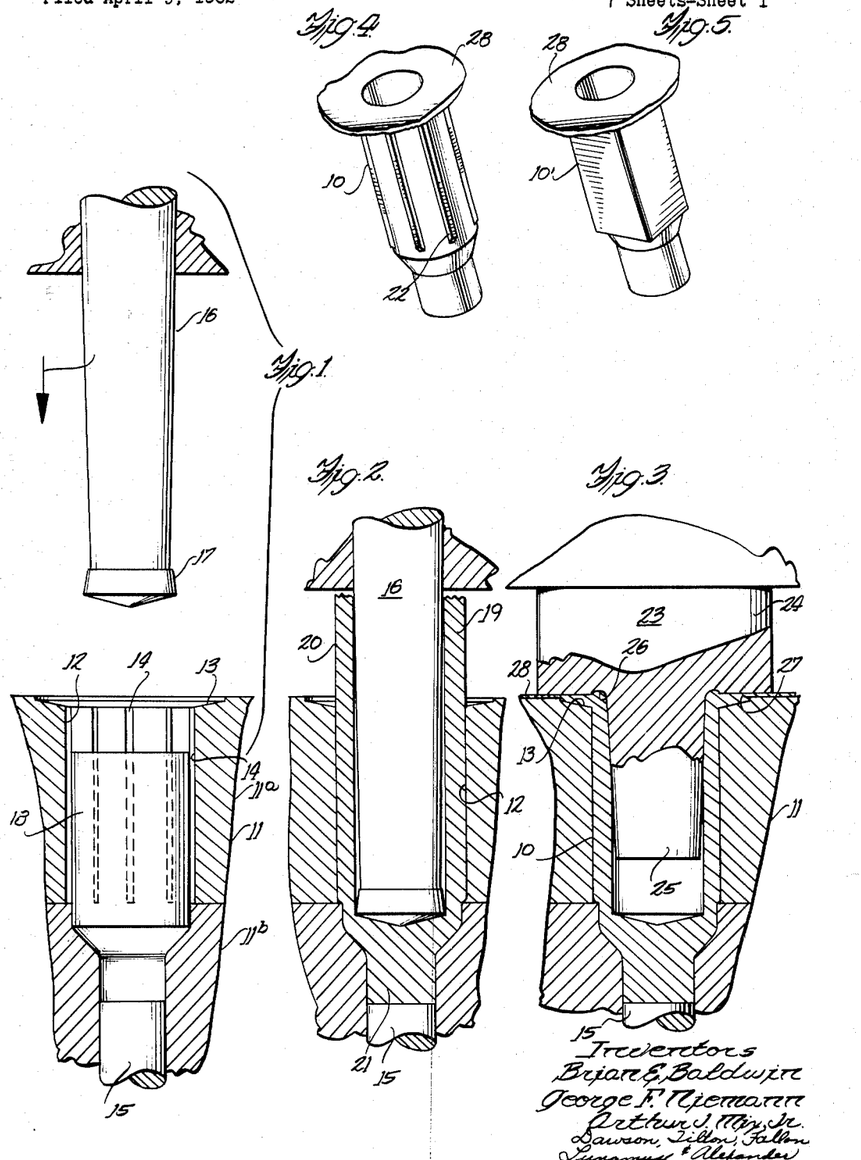
FIGURE 1 is a fragmentary longitudinal sectional view illustrating the relationship of elements at the commencement of a hub-forming operation.
FIGURE 2 is a sectional view similar to FIGURE 1 but showing the punch at the completion of its downstroke.
FIGURE 3 is a sectional view similar to FIGURE 2 but showing a second punch at the completion of its downstroke.
FIGURES 4 and 5 illustrate two types of blanks which may be formed by the steps ilustrated in FIGURES 1–3.

Referring to the drawings, FIGURES 1–3 illustrate three steps in the method of forming a blank 10 of the type shown in FIGURE 4. From the following description, it will be apparent that blanks of other shapes, such as blank 10′ (FIGURE 5), may be formed by the same procedure, the only difference being the shape of the lower or female die.

The lower die 11 may, if desired, be formed in two sections 11a and 11b and defines a cavity 12 which corresponds with the outer surface contour of the final hub. The generally cylindrical side wall of the cavity is fluted at 14 and the lower portion of the cavity is of reduced diameter. The cavity's lower end is closed by a reciprocable knockout pin 15 which is capable of sliding upwardly from the position illustrated in FIGURE 1 to expel a fully formed blank from the lower die 11.

The upper die or punch 16 is of substantially greater length than the upper portion of cavity 12 and, as shown in FIGURES 1 and 2, is gradually tapered and is provided with an enlarged head 17. The diameter of head 17 is substantially smaller than the internal diameter of the cavity's generally cylindrical upper portion, the difference in diameter being the wall thickness of a hub blank to be formed thereby. As it is well understood in the art, the upper and lower dies are axially movable with respect to each other; preferably the lower die 11 is stationary, at least in axial directions, and the upper die 16 is mounted for reciprocatory movement.

One aspect of this invention lies in the recognition that it is possible to cold-form the hubs of hypodermic needles if the blanks for such hubs are formed in two successive steps, the first step involving the flowing of metal and the second step involving the pressing and bending of such metal. Specifically, it has been found that hubs having shapes similar to screw-machined hubs may be cold-formed by first reversely flowing the metal to provide an upstanding sleeve projecting out of the die and then, in a second step, flattening this sleeve to form an annular flange. By providing each blank with an enlarged annular flange, it has also been found possible to eliminate problems of closely controlling slug length and, at the same time, provide means for supporting each blank during later piercing and finishing steps.

As the first step in the method of forming a blank 10, a deformable metal slug 18 is placed within cavity 12. It will be observed that the cross-sectional dimensions of the cylindrical slug are approximately the same as the diameter of the cavity's upper portion but that the slug is appreciably shorter than such upper portion. The slug may be cut from wire and is formed of a malleable metal such as aluminum.

When the punch 16 descends into the cavity the metal of the slug is forced laterally against the sides of the cavity and downwardly into the cavity's lower portion. In addition, the metal flows upwardly in a reverse direction out of the cavity to form an upstanding sleeve portion 19 (FIGURE 2). The result is a cup-shaped partially-formed blank 20 having an open upper end and a closed lower end 21. It will be noted that in this first blow of the punch 16 the metal of the slug flows laterally into the flutes of the cavity to provide the ribs 22 as they appear along the barrel of the finished hub blank (FIGURE 4).

Punch 16 is withdrawn, leaving the partially-formed blank 20 within the cavity 12, and a second punch 23 is forced into and against the lower die. As shown in FIGURE 3, punch 23 is provided with an upper portion of considerably greater diameter than cavity 12 and a lower portion 25 coaxial with the upper portion. The lower portion 25 is tapered, having a diameter at its lower end smaller than the internal diameter of the partially-formed blank 20 but having a diameter at its upper end greater than the internal diameter of such partially-formed blank. In addition, the punch 23 has an annular groove 26 at the junction of the frusto-conical surface of lower portion 25 and the flat undersurface 27 of upper portion 24.

When the tapered lower portion of punch 23 enters cavity 12 the side surface thereof presses against the cylindrical interior surface of the partially-formed blank and produces an accurate taper in the blank adjacent the mouth thereof. At the same time, the upper portion of the punch bears against the upstanding collar portion 19 and bends it downwardly into recess 13, and laterally beyond that recess, to form an enlarged annular flange 28. The size of flange will vary slightly from blank to blank depending upon the size of the slugs 18 but, in any case, the slugs are of sufficient size to provide enough material to fill flange recess 13. Groove 26 facilitates the smooth bending and lateral displacement of the metal of collar 19 as punch 23 executes its downward stroke.

After the reciprocable punch 23 returns to a raised position, the finished blank 10 is ejected from cavity 12 by the movable knock-out pin 15. The ejected blanks are then collected and, supported by their enlarged flanges, are carried to the hub piercing station.

Figure 11:
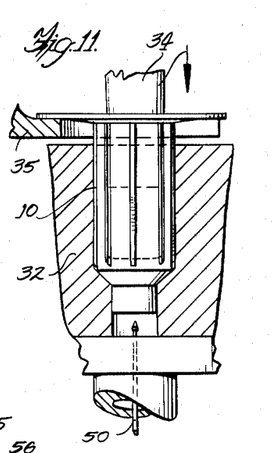
FIGURE 11 is a sectional view similar to FIGURES 9 and 10 but shows the hub blank fully clamped between a pair of opposing jaws immediately prior to a piercing of the blank's end wall.
Figures 12, 13:
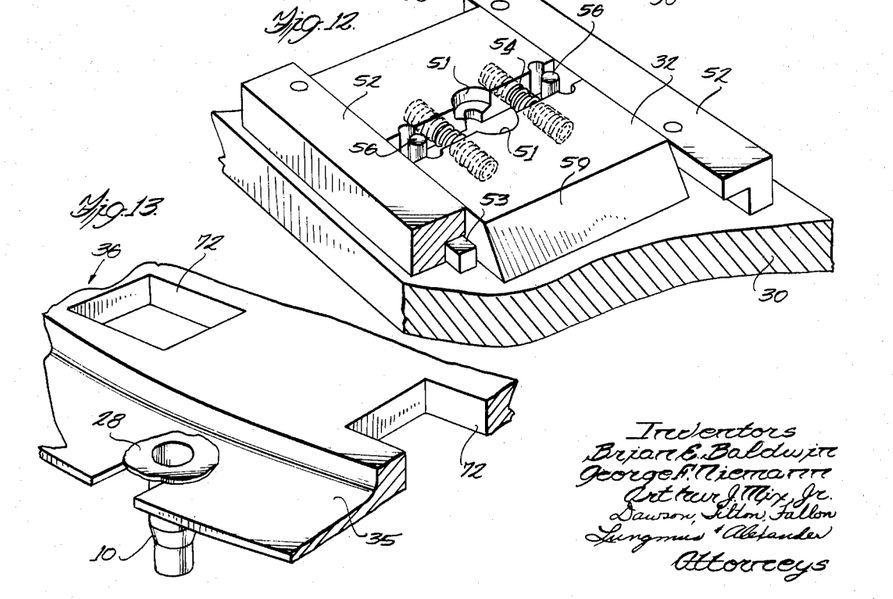
FIGURE 12 is a broken perspective view illustrating the movable jaw arrangement for supporting hub blanks as they are pierced.
FIGURE 13 is a broken perspective view showing the hub supporting portion of a turret for moving hubs into and out of the piercing station.

FIGURES 6 through 13 illustrate the fixture 29 for piercing the hub blanks 10. The fixture essentially comprises a spring-mounted platform 30, a piercing pin assembly 31, a pair of clamping jaws 32, a cam 33, plunger 34 and hub support member 35. Support member 35 may be part of a turret 36 which is adapted to carry the hub (or hub blanks) by their enlarged flanges to the piercing and trimming stations (FIGURE 13).

Platform 30 is mounted for limited vertical movement by means of coil springs 37 and 38. The posts are threadedly secured to the undersurface of the platform and are slidably received within openings provided in a base 39. Normally, the platform is supported by the compression springs in the raised position shown in FIGURE 6. In the center of the platform is a large opening 41 in which is fitted a bushing 42 slidably receiving the column 43 of the piercing pin assembly.

Figure 6:
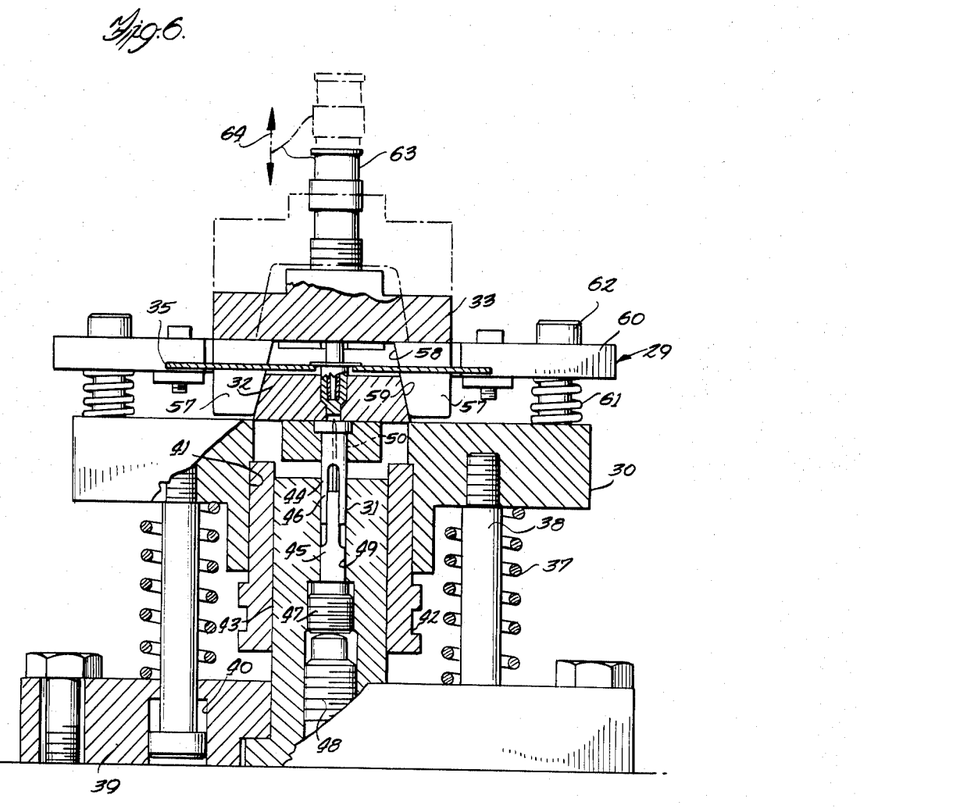
FIGURE 6 is a front elevational view of a device for piercing hub blanks, the device being shown partly in section.

The piercing pin assembly 31 comprises a stationary column or standard 43 affixed to base 38, a pair of sleeve members 44 and 45 provided with interfitting fingers 46 which permit relative axial movement of the members but prevent movement of such members out of axial alignment, adjustment screws 47 and 48 which anchor the lower sleeve member 45 within the central bore 49 of the column and an upstanding piercing pin 50 rigidly carried by the lower sleeve member 45 and slidably received within a central bore of the upper sleeve member 44.

The clamping jaws 32 are illustrated most clearly in FIGURES 12 and 6 where it will be observed that the opposing faces of the jaws are provided with complementary recesses 51 which together define a cavity for tightly receiving a hub blank 10. As shown in the enlarged view of FIGURE 8, the surface of recess 51 conforms closely to the outer surface contour of hub blank 10 so that lateral expansion of the blank during a piercing operation may be effectively prevented by the clamping jaws.

The jaws 32 are guided for horizontal sliding movement upon platform 30 by means of guide elements 52 (FIGURE 12). These elements are secured in parallel relation to the platform's upper surface and extend over lateral flanges 53 provided by the jaws. Helical compression springs 54 extend between the opposing jaws and urge the jaws into the spaced positions shown in FIGURE 12. Stop pins 55 are engageable with the ends of flanges 53 to limit the extent of separation of the jaws and alignment pins 56 are disposed between the jaws to equalize the extent of inward movement of the respective jaws.

Inward movement of the jaws is controlled by cam 33. The depending legs 57 of the cam are provided with downwardly and outwardly sloping inner surfaces 58 which are engageable with the inclined end walls 59 of the jaws to urge the jaws together as the cam descends. The cam is mounted upon a guide plate 60 which is in turn supported by springs 61 and pins 62 for vertical movement with respect to platform 30. The top of the cam 33 is connected directly to a reciprocable ram 63 which is driven in opposite directions, as indicated by arrow 64, by any suitable driving means (not shown).

Figures 7, 8:
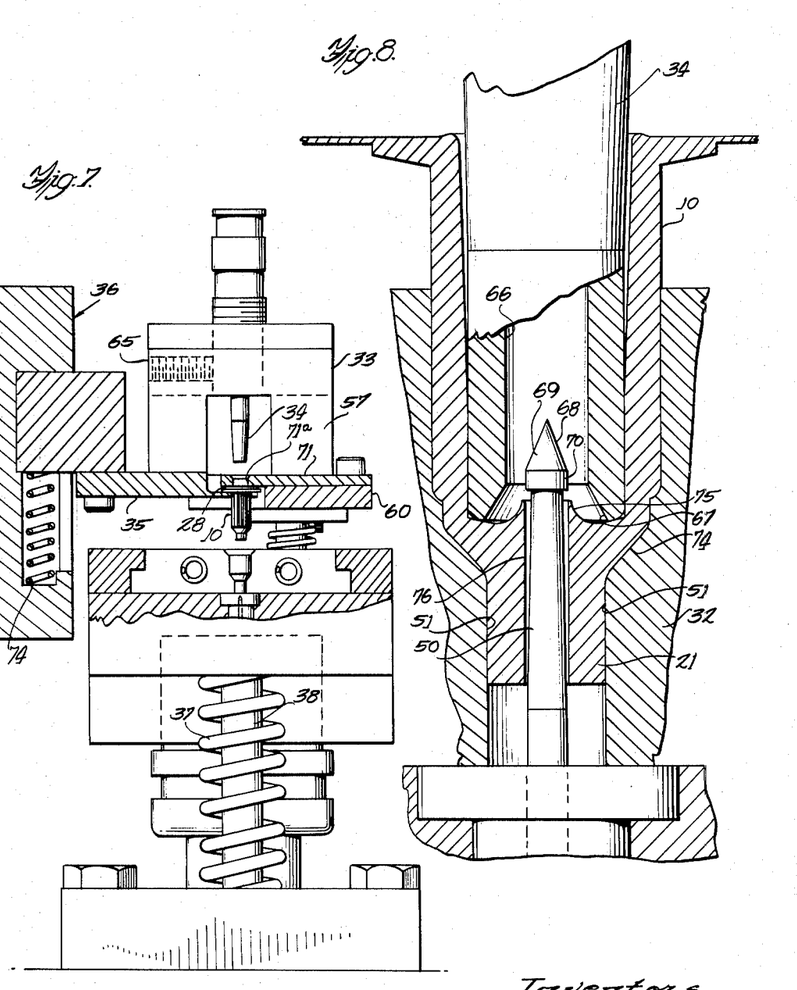
FIGURE 7 is a side elevational view, shown partly in section, of the fixture of FIGURE 6.
FIGURE 8 is an enlarged vertical sectional view showing a hub blank immediately after it has been pierced.

Plunger 34 is adjustably secured by screw 65 to the reciprocable cam and extends downwardly between the legs of the cam in axial alignment with the piercing pin assembly 31. As shown in FIGURE 8, the plunger is tapered and has an axial passage 66 extending upwardly from its lower end. The diameter of the passage is substantially larger than the maximum diameter of piercing pin 50. The bottom inner edge of the plunger is chamfered at 67 to provide a flared opening or mouth for passage 66.

The piercing pin 50 is gradually tapered and is provided at its upper end with an enlarged head 68 (FIGURE 8). The head has a conical upper portion 69 and a cylindrical lower portion 70, the latter having a diameter greater than its length and substantially equal to the diameter of the hole to be pierced thereby. Referring to FIGURE 8 it will be observed that the diameter of cylindrical lower portion 70 is greater than the diameter of any other portion of the pin which passes through the end of a blank 10 clamped between jaws 32.

Figures 9, 10:
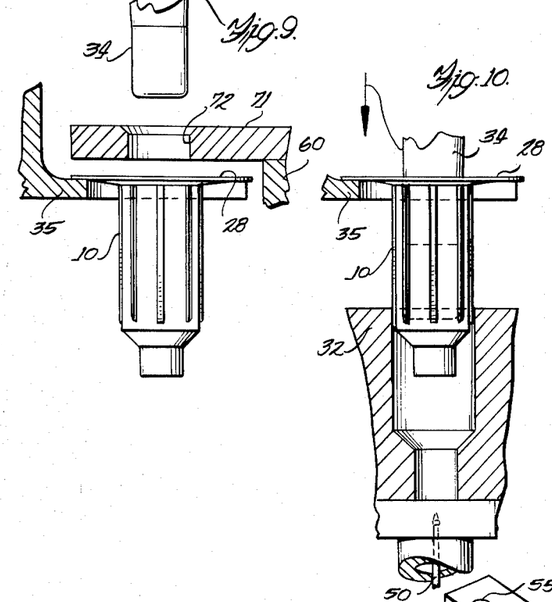
FIGURE 9 is an enlarged sectional view of smaller scale than FIGURE 8 showing a supported hub blank prior to insertion of a reciprocable plunger therein.
FIGURE 10 is similar to FIGURE 9 but illustrates a second step in the piercing operation.

Directly above and secured to guide plate 60 is a stripper plate 71 having an aperture 71a in axial alignment with the piercing pin 50 and plunger 34. Aperture 71a is large enough to permit the plunger to pass downwardly therethrough but is of smaller diameter than the enlarged flange 28 of a hub blank 10 supported by the movable hub support member 35 directly therebelow (FIGURE 9). Support member 35 has its edge recessed to receive and support a hub blank having its open end facing upwardly in alignment with plunger 34. Member 35 is also provided with spaced openings 72 which permit the legs of cam 33 to pass downwardly therethrough. However, the vertically-movable support member, normally held in raised position by springs 74, will move downwardly with guide plate 60 into the position shown in FIGURE 6 upon engagement by that portion of the cam bridging the spaced cam legs 57.

FIGURES 9, 10, 11 and 8 illustrate the sequence of steps in the hub piercing operation. A hub blank 10 is first positioned beneath raised plunger 34. The plunger and cam then descend, the lower end of the plunger fitting snugly into the bore or cavity of the hub blank and driving the hub blank downwardly between the spaced jaws 32 (FIGURE 10). The spaced jaws, engaged by the inclined surfaces 58 of cam 33 (FIGURE 6) move towards each other and, immediately after the blank is fully lowered between the jaws, engage the hub blank to clamp it firmly in position (FIGURE 11).

After the hub blank is tightly clamped between the opposing jaws, the plunger 34 and cam 33 continue their downward stroke, forcing the hub blank, jaws 32 and platform assembly 30 downwardly with them. The upper protective sleeve member 44 of the piercing pin assembly is engaged by the undersurfaces of the jaws and is similarly forced downwardly to uncover the pointed head 68 of the fixed piercing pin 50. The cam, plunger, platform and upper sleeve member continue downwardly until the closed end of the downwardly traveling hub blank has been fully pierced by the stationary pin 50 (FIGURE 8). The moving parts then begin an upward stroke to withdraw the pierced hub from the pin and to return the parts to their starting positions. Stripper plate 71 engages the flange of the hub to assist in separating the hub and the tapered end of the upwardly moving plunger 34.

It should be noted that at the time the hub is pierced by pin 50 the opposing surfaces 51 of the jaws 32 fully engage the outer surface of the hub's reduced neck portion 21 as well as the sloping surface of shoulder 74. Therefore, the clamping jaws prevent the lateral flow or displacement of metal of the hub as the piercing pin passes therethrough. The only possible displacement of metal is in a generally axial direction and such flow, unrestricted by the chamfered edges of the plunger, results in a characteristic crater-like formation 75 within the interior of the needle hub. By preventing radial or lateral displacement of metal without in any way restraining the axial flow thereof, it has been found possible to pierce an opening or hole 76 of a length five or more times its diameter without danger of pin deflection and damage.

After the piercing operation, the hubs, supported by their enlarged flanges in the manner already described, are advanced to the trimming station. The trimming fixture 77 is illustrated in FIGURES 14 through 22 and essentially comprises a pair of swingable hub-supporting jaws 78, upper and lower trimming dies 79 and 80, means 81 for maintaining the jaws in spread-apart positions when the movable upper die is lowered, and means 82 for returning the jaws to their raised positions when the upper die is raised.

The trimming device includes a base 83 upon which is mounted a supporting frame 84. The upper or male die 79 is mounted for sliding vertical movement in a passage 85 of rectangular cross section passing downwardly through the frame. The die itself, as shown clearly in FIGURES 14–16 and 19, has an upper portion 86 of rectangular cross section and a lower portion 87 of reduced cross-sectional dimensions. The cross-sectional configuration of portion 87 defines the outline of the flange of a hub as trimmed by the device. At its lower end, the upper die is provided with a tapered pilot 88 adapted to be received within the opening or cavity of a needle hub.

Figure 16:
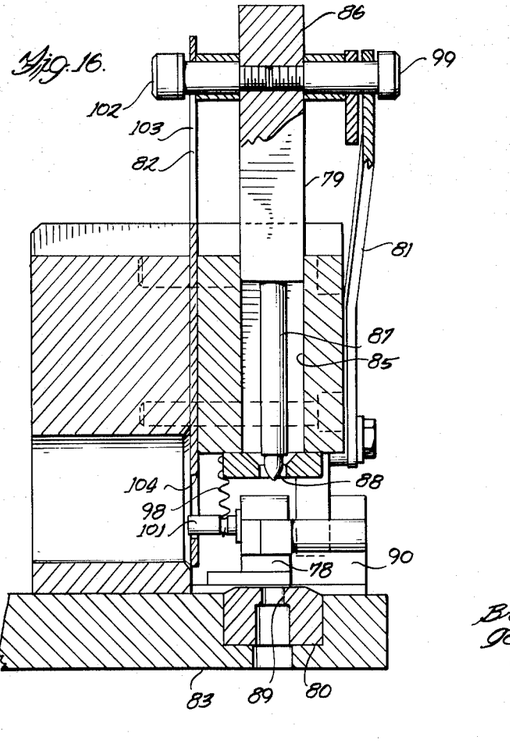
FIGURE 16 is a side elevation of the trimming device, the view being taken partly in section to illustrate more clearly the relationship of parts.
Figure 17:
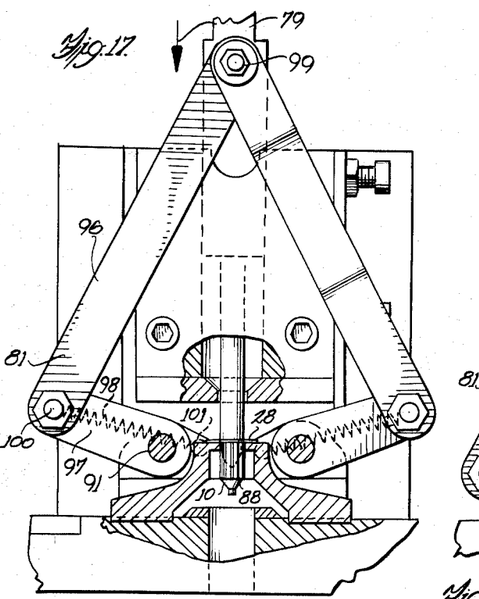
FIGURE 17 is an elevational view of the trimming device when the punch has descended sufficiently to insert the pilot within a supported hub.

The lower female die 80 is fixed to the base 83 and as illustrated in FIGURE 16 is provided with an opening 89 extending vertically therethrough. This opening is axially aligned with the upper die and at least the upper portion thereof is of a size and shape defining the outline of a trimmed flange.

Figure 14:
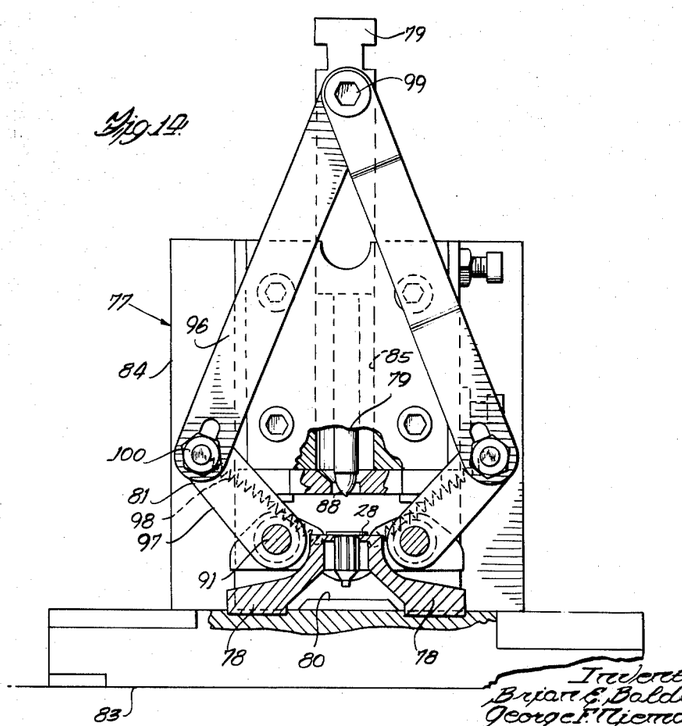
FIGURE 14 is a front elevational view, taken partly in section, of the hub trimming device embodying the present invention.
Figure 15:
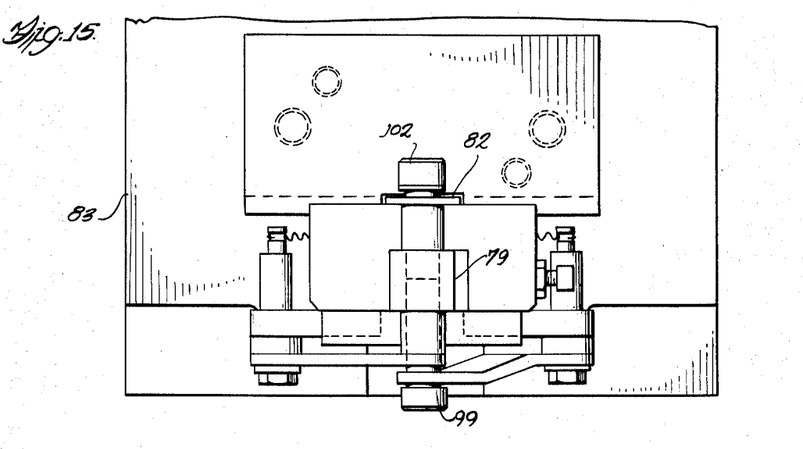
FIGURE 15 is a broken top plan view of the trimming device.

The hub-supporting jaws 78 are disposed immediately above the lower die and are normally positioned as shown in FIGURES 14 and 16 between the upper and lower dies. A pair of jaw-mounting members 90 (FIGURES 18, 21 and 22) are fixed to the base in front of the jaws and carry horizontal pivot pins 91 on which the jaws 78 are pivotally mounted. It will be noted that the jaw-mounting members are provided with horizontal surfaces 92 which are spaced apart by a channel 93 to support needle hubs by their enlarged flanges. The jaws 78 have similar surfaces 94 which lie along the same plane as surfaces 92 when the jaws are in their raised positions. However, the spacing between the hub-supporting ends of the opposing jaws is reduced intermediate the width of the jaws to limit the extent of horizontal sliding movement of a needle hub between those jaws. Thus, the edges 95 are effective as stop means to locate inserted hubs in vertical alignment with the upper and lower dies 79 and 80.

Figure 18:
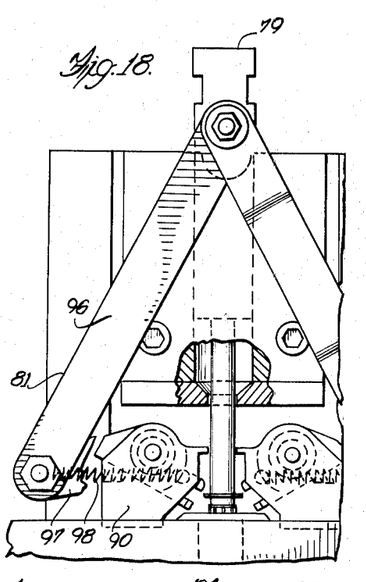
FIGURE 18 is a broken elevational view similar to FIGURE 17 but showing a hub supported thereby immediately after it flange has been trimmed and the movable die has commenced its upstroke.
Figures 19, 20, 21, 22:
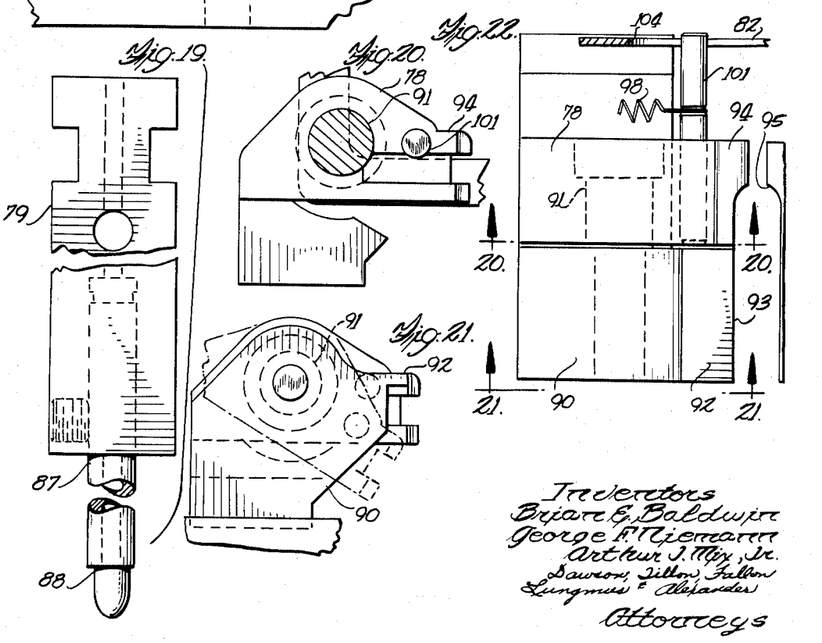
FIGURE 19 is an enlarged broken elevational view of the punch assembly for the trimming apparatus.
FIGURE 20 is an enlarged broken elevational view of a hub support jaw in it raised supporting position.
FIGURE 21 is an enlarged elevational view of the mount for a hub support jaw.
FIGURE 22 is an enlarged top plan view of the jaw and jaw mount shown in FIGURES 20 and 21.

The means 81 for holding the swingable jaws in the lowered positions of FIGURE 18 while the upper die executes the lower part of its downward stroke comprises links 96 and 97 and springs 98. A pair of links 96 and 97 are provided for controlling the action of each jaw. As shown in the drawings, each elongated link 96 is pivotally connected at its upper end to the upper die 79 by means of bolt 99. At their lower ends, the links 97 are pivotally connected by bolts 100 to the outer ends of shorter links 97, the inner ends of the shorter links being pivotally connected to pins 91. Springs 98 extend between bolts 100 and pins 101 carried by jaws 78 adjacent the inner free ends thereof.

Means 82 for swinging the pivotal jaws into raised position when the upper die is raised comprises a single linking or connecting element extending between pin 102 at the upper end of movable die 79 and the rearwardly projecting pins 101 carried by the swingable jaws (FIGURE 16). The connecting element receives pin 102 in an elongated vertical slot 103 which permits considerable free upward travel of the die 79 before the jaws are drawn upwardly. The opening 104 which receives the ends of jaw pins 101 is also enlarged to permit unrestricted pivotal movement of the jaws between their raised and lowered positions.

In operation of the trimmer, needle hubs which have been pierced and are complete except for flange trimming are urged along channel 93 and into the space between raised jaws 78. Any suitable pushing or advancing means, synchronized in its operation with the reciprocation of movable die 79, may be used. As the die moves downwardly from the position illustrated in FIGURE 14 to the position of FIGURE 17, pilot 88 enters the interior of a hub suspended between the jaws by its enlarged flange 28. Continued downward movement of the punch forces the flange-supporting surfaces of the jaws downwardly and the pivotally-mounted jaws swing downwardly and outwardly against the restraining force of tension springs 98. When the hub-supporting surfaces of the jaws have swung a sufficient distance downwardly and outwardly to permit entry of the hub and upper die into the opening of the lower die, the bolted joints between links 96 and 97 have descended sufficiently so that springs 98 extend below the pivot lines of the jaws (FIGURE 18). As a result, the springs exert outward forces on the lowered jaws to hold those jaws in their lowered positions until the movable die is substantially fully raised.

Since the cutting edges of the dies define the outline of a trimmed flange, the dies trim the flange of a hub as the hub is forced downwardly into and through the opening 89 of the lower die. A ring of trimmed metal will tend to remain about the shaft of the upper die as it executes its upward stroke but this ring is stripped from the die by the undersurface of the frame as the die is retracted into passage 85. If desired, a suitable suction device (not shown) may be provided for withdrawing the stripped rings to prevent interference with subsequent trimming operations.

Figure 23:
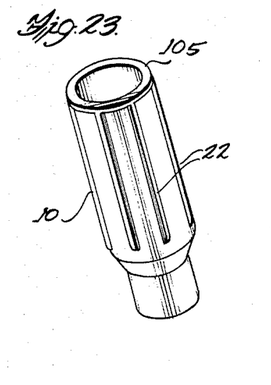
FIGURES 23 and 24 illustrate two finished hubs which are identical except for trimmed flanges of different shapes.
Figure 24:
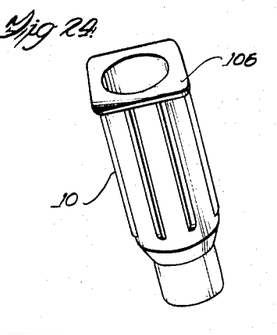

The finished hubs are discharged through the opening 89 in the lower die and, using the particular equipment illustrated in the drawings, would have the appearance of the trimmed hub shown in FIGURE 23. Such a hub has a small annular flange 105 which projects outwardly from the cylindrical sides of the hub approximately the same distance as ribs 22. It is to be understood, however, that flanges of a wide variety of shapes and sizes may be formed by simply substituting dies of different design. Thus, by using dies 79 and 80 of rectangular rather than circular cross section, the same hub 10 may be provided with a rectangular trimmed flange 106, as shown in FIGURE 24.

While in the foregoing we have disclosed an embodiment of the present invention in considerable detail for purposes of illustration, it will be understood by those skilled in the art that many of these details may be varied without departing from the spirit and scope of the invention.

We claim:

1. In a needle hub forming method, the steps of inserting a tubular plunger into the open end of a hub blank, said blank having an imperforate neck portion at one end thereof, advancing said plunger and blank between a pair of clamping jaws having complementary recesses defining a cavity in axial alignment with said plunger, and advancing said plunger, blank and clamping jaws towards a hub-piercing pin to pierce the neck portion of said blank while restraining lateral displacement of the material thereof, said blank being oriented between said jaws so that said neck portion faces and is advanced toward said piercing pin.

2. In a hub blank piercing device, a pair of clamping jaws having complementary recesses together defining a cavity conforming with the outer surface contour of a hub blank provided with an imperforate neck portion at one end thereof, a piercing pin mounted in axial alignment with said cavity, and means supporting said jaws and pin for relative axial movement of said pin into said cavity from the end of the cavity adapted to receive the neck portion of a hub blank, whereby, upon relative movement of said jaws and pin towards each other, said pin enters said cavity to pierce the imperforate neck of a hub blank supported therein while said jaws prevent lateral displacement of the material of said hub.

3. In a hub blank piercing device, a pair of clamping jaws having complementary recesses together defining a cavity conforming with the outer surface contour of a hub blank, a piercing pin mounted in axial alignment with said cavity, and means supporting said jaws and pin for relative axial movement, said clamping jaws being movable towards and away from each other, means urging said jaws apart, and cam means engageable with said jaws as a hub blank is inserted therebetween for shifting said jaws into clamping contact with said blank, whereby, upon relative movement of said jaws and pin towards each other, said pin enters said cavity to pierce the imperforate neck of a hub blank supported therein while said jaws prevent lateral displacement of the material of said hub.

4. In a hub blank piercing device, a pair of clamping jaws having complementary recesses together defining a cavity conforming with the outer surface contour of a hub blank, a piercing pin mounted in axial alignment with said cavity, said piercing pin being tapered and being provided with an enlarged pointed head, and means supporting said jaws and pin for relative axial movement, whereby, upon relative movement of said jaws and pin towards each other, said pin enters said cavity to pierce the imperforate neck of a hub blank supported therein while said jaws prevent lateral displacement of the material of said hub.

5. The structure of claim 4 in which the head of said pin is provided with a cylindrical portion and a conical end portion, said cylindrical portion being shorter than the diameter thereof.

6. In a hub blank piercing device, a plunger having an end portion insertable into the open end of a needle hub blank, said end portion of said plunger having an axial opening therein, a pair of clamping jaws having complementary recesses together defining a cavity conforming closely within the outer surface contour of a hub blank, a hub piercing pin, said pin, plunger and jaw cavity all being disposed in axial alignment, and means mounting said plunger, jaws and pin for relative axial movement of said pin towards said plunger and through a hub blank supported by said jaws, whereby, as a clamped hub blank is pierced by said pin said jaws prevent lateral displacement of the material of said hub to protect said pin against deflection and damage.

7. In a hub blank piercing device, a plunger having an end portion insertable into the open end of a needle hub blank, a pair of clamping jaws having complementary recesses together defining a cavity conforming closely with the outer surface contour of a hub blank, said jaws being mounted for movement towards and away from each other between clamping and unclamping positions, cam means associated with said plunger and engageable with said jaws for urging said jaws into clamping positions as said plunger is moved towards said jaws, a hub piercing pin, said pin, plunger and jaw cavity all being disposed in axial alignment, and means mounting said plunger, jaws and pin for relative axial movement, whereby, as a clamped hub blank is pierced by said pin said jaws prevent lateral displacement of the material of said hub to protect said pin against deflection and damage.

8. In a hub blank piercing device, a plunger having an end portion insertable into the open end of a needle hub blank, a pair of clamping jaws having complementary recesses together defining a cavity conforming closely with the outer surface contour of a hub blank, a hub piercing pin, said pin, plunger and jaw cavity all being disposed in axial alignment, and means mounting said plunger, jaws and pin for relative axial movement, said plunger being provided with an axial opening in the end portion thereof for receiving the end of said piercing pin, said opening being substantially larger in diameter than said pin and having a chamfered inner lower edge, whereby, as a clamped hub blank is pierced by said pin said jaws prevent lateral displacement of the material of said hub to protect said pin against deflection and damage.

9. In a hub blank piercing device, a plunger having an end portion insertable into the open end of a needle hub blank, a pair of clamping jaws having complementary recesses together defining a cavity conforming closely with the outer surface contour of a hub blank, a hub piercing pin, said pin being tapered and being provided with an enlarged head, said head being pointed and having a relatively short cylindrical portion, said pin, plunger and jaw cavity all being disposed in axial alignment, and means mounting said plunger, jaws and pin for relative axial movement, whereby, as a clamped hub blank is pierced by said pin said jaws prevent lateral displacement of the material of said hub to protect said pin against deflection and damage.

References Cited by the Examiner
UNITED STATES PATENTS

| | | | |
|---|---|---|---|
| 1,310,123 | 7/1919 | Leighton | 29—534 |
| 1,672,082 | 6/1928 | Oakley | 29—157.1 |
| 1,929,802 | 10/1933 | Brauchler | 29—556 X |
| 1,963,319 | 6/1934 | Wright | 78—9 X |
| 1,968,792 | 7/1934 | Yeomans | 29—542 |
| 2,042,994 | 6/1936 | Honiss | 83—13 |
| 2,057,669 | 10/1936 | Brauchler | 29—556 |
| 2,264,455 | 12/1941 | Peck | 29—534 |
| 2,342,021 | 2/1944 | Swanson | 29—556 X |
| 2,778,101 | 1/1957 | Dullum | 29—535 |
| 2,789,344 | 4/1957 | Kaul | 29—540 X |
| 2,832,133 | 4/1958 | Giacosa | 29—556 |
| 2,855,929 | 10/1958 | Hein | 128—221 |
| 2,911,044 | 11/1959 | Erskine | 83—13 |

WHITMORE A. WILTZ, *Primary Examiner.*